United States Patent [19]

Senba

[11] Patent Number: 5,247,399
[45] Date of Patent: Sep. 21, 1993

[54] DIGITAL VIDEO RECORDING AND PLAYBACK APPARATUS USING DIFFERENT READ AND WRITE OPERATIONS FOR EACH INDIVIDUAL MEMORY

[75] Inventor: Katsumi Senba, Nagaokakyo, Japan

[73] Assignee: Mitsubishi Denki Kabushiki Kaisha, Tokyo, Japan

[21] Appl. No.: 892,703

[22] Filed: May 29, 1992

Related U.S. Application Data

[63] Continuation of Ser. No. 519,452, May 4, 1990, abandoned.

[30] Foreign Application Priority Data

May 15, 1989 [JP] Japan .................................. 1-122008

[51] Int. Cl.⁵ .............................................. G11B 5/09
[52] U.S. Cl. .............................................. 360/32
[58] Field of Search ................ 560/32, 60, 65, 8, 9.1, 560/10.1, 11.1, 35.1, 15, 37.1

[56] References Cited

U.S. PATENT DOCUMENTS

| | | | |
|---|---|---|---|
| 4,165,495 | 8/1979 | Takahashi | 360/65 |
| 4,334,247 | 6/1982 | Lemke | 360/32 |
| 4,523,237 | 6/1985 | Fukudu et al. | 360/32 |
| 4,763,207 | 8/1988 | Podolak et al. | 360/32 |
| 4,775,901 | 10/1988 | Nakano | 360/60 |
| 4,858,032 | 8/1989 | Okada et al. | 360/32 |
| 4,991,034 | 2/1991 | Sato | 360/32 |
| 5,021,893 | 6/1991 | Scheffler | 360/32 |

Primary Examiner—John Shepperd
Assistant Examiner—Won Tae C. Kim

[57] ABSTRACT

In a digital video recording and playback apparatus, at the time of recording, an analog signal is converted into a digital signal by an analog/digital converter and the thus-converted digital signals are stored in a memory on the recording side for each unit such as a frame and a field under the control of a memory address controller on the recording side. The stored digital signals are recorded on a digital audio tape by a digital recording device. At the time of playback, the digital signals are played back from the digital audio tape by a digital playback device, and are stored in a memory on the playback side for each unit such as a frame and a field under the control of a memory address controller on the playback side. The stored digital signals are converted into analog signals by a digital/analog converter before being outputted.

The read and write operations for each individual memory are different.

10 Claims, 4 Drawing Sheets

→ DIRECTION OF FEEDING

ONE HORIZONTAL SCANNING PERIOD

DIGITAL VIDEO RECORDING AND PLAYBACK APPARATUS USING DIFFERENT READ AND WRITE OPERATIONS FOR EACH INDIVIDUAL MEMORY

This application is a continuation of application Ser. No. 07/519,452 filed on May 4, 1990, now abandoned.

BACKGROUND OF THE INVENTION

1. Field of the Invention

The present invention relates to digital video recording and playback apparatus. More particularly, the present invention relates to the structure of a digital video recording and playback apparatus, namely, a digital audio tape recorder (hereinunder referred to as "DAT") which is applied to a still picture filming apparatus.

2. Description of the Related Art

FIG. 6 shows an example of the structure of a DAT.

This apparatus has the following structure. An analog/digital converter (hereinunder referred to as "A/D converter") 1, a memory 2, an interleaving circuit 3 and a digital recording portion 4 are connected in series, and the digital recording portion 4 is connected to a recording head 6 which is in contact with a digital audio tape 5. A playback head 7 which is in contact with the digital audio tape 5 is connected in series to a digital playback portion 8, a memory 9, a de-interleaving circuit 10 and a digital/analog converter (hereinunder referred to as "D/A converter") 11.

The operation of this apparatus will now be explained.

The operation of recording a signal into the digital audio tape 5 will first be explained.

In this case, an analog audio signal is inputted to the A/D converter 1 so as to be converted into a digital audio signal. The digital audio signal outputted from the A/D converter 1 is stored in the memory 2. The memory 2 has a storage capacity of, for example, about 128 kbits.

The digital audio signal stored in the memory 2 is read out to the interleaving circuit 3. The interleaving circuit 3 subjects the digital audio signal to an interleave processing. The interleave processing is generally a processing for intermittently recording a pair of digital signals so as to avoid lumped recording of the signals. For example, this processing enables digital signals to be corrected and compensated at the time of playback against the generation of continuous errors due to the defect, flaws, etc. of a digital audio tape (corresponding to the digital audio tape 5 in FIG. 6) on which the digital signals are recorded.

The digital audio signal subjected to the interleave processing is supplied to the digital recording portion 4 and recorded on the digital audio tape 5 through the recording head 6.

The operation of playing back the digital audio signal from the digital audio tape 5 will be explained in the following.

When the digital audio signal is played back from the digital audio tape 5 through the playback head 7 by the playback portion 8, the digital audio signal is stored in the memory 9. The memory 9 has a storage capacity of about 128 kbits.

The digital audio signal stored in the memory 9 is supplied to the de-interleaving circuit 10. The de-interleaving circuit 10 releases the digital audio signal from the interleave processing given by the interleaving circuit 3 at the time of recording. The digital audio signal is supplied from the de-interleaving circuit 10 to the D/A converter 11 to be converted into an analog audio signal and is outputted to an analog signal processor.

When such a DAT is used as a still picture filming apparatus, the storage capacities of the memories 2, 9 are insufficient. For example, an NTSC standard picture (resolution: 640 horizontal dots × 480 vertical lines) is written in the memory 2 at real time. The picture read out of the memory 2 is recorded on the digital audio tape 5. The storage capacity of the memory 2 is insufficient for storing the digital signals relating to the picture.

In addition, when the digital signals relating to the picture are recorded on the digital audio tape 5, various formats may be adopted in the present state of art, but it is difficult for the structure of the apparatus shown in FIG. 6 to correspond to a plurality of formats.

When digital signals relating to a still picture are played back from the digital audio tape 5 and supplied to an external apparatus such as in the case of dubbing, it is necessary to deteriorate the picture quality to a certain extent for the protection of copyright or the like. Such treatment is impossible in a conventional apparatus.

SUMMARY OF THE INVENTION

Accordingly, it is an object of the present invention to eliminate the above-described problems in the related art and to realize the application of a DAT to a still picture filming apparatus by securing the storage capacities of the memories, to secure the adaptability of recording formats and to enable the quality of an output picture to be deteriorated as occasion demands.

To achieve this aim, a digital video recording and playback apparatus according to the present invention comprises:

a) an analog/digital converter for outputting an analog signal in the form of a digital signal;

b) a memory on the recording side for dividing digital signals outputted from the analog/digital converter into predetermined units and storing the divided digital signals;

c) a memory address controller on the recording side for controlling the writing/reading operation on the recording side so that the units of digital signals are written into and read out of the memory on the recording side in a predetermined order;

d) a digital recording device for recording a digital signal on a digital tape;

e) a digital playback device for outputting the digital signal played back from the digital audio tape; and f) a digital/analog converter for converting the digital signal into an analog signal.

This structure, in particular the structure for storing the units of digital signals in the memory on the recording side, enables the digital signals to be recorded on the digital tape while securing the storage capacity of the memory with efficiency, thereby enabling the application of a DAT to a still picture filming apparatus.

The control of the writing/reading operation, in particular the control of the order of the writing/reading operation by the memory address controller on the recording side, can secure the adaptability of the DAT to various recording formats for the digital audio tape.

A digital video recording and playback apparatus according to the present invention may further comprise:

g) a memory address controller on the playback side for controlling the writing/reading operation of the memory on the playback side so that the units of digital signals are written into and read out of the memory on the playback side in a predetermined order.

This structure enables the capacity of the memory on the playback side at the time of playback to be efficiently secured.

A digital video recording and playback apparatus according to the present invention may further comprise:

h) an amplifier for amplifying the analog signal obtained by the conversion of the digital/analog converter at a gain which varies depending upon whether the operation is in the permission mode or in the inhibition mode.

According to this structure, the gains at which analog signals are amplified vary depending upon whether the operation is in the permission mode or in the inhibition mode. In other words, the external output in the inhibition mode is an expanded or compressed analog signal as compared with an analog signal in the permission mode. Therefore, for example, at the time of dubbing, an external apparatus which receives such analog signals in the inhibition mode cannot obtain analog signals having the same quality, in particular, the same picture quality in the case of a still picture as that of the digital signals recorded on the digital tape. Thus, the deterioration of the picture quality which is necessary, for example, at the time of dubbing is realized.

The unit for storing in the memory on the recording side is preferably the magnitude of digital signals corresponding to one frame or one field. Signals are stored in the memory on the playback side by the unit which corresponds to the unit in the memory on the recording side.

It is effective especially for the recording/playback of digital signals relating to a still picture that the memory on the recording side has a capacity necessary for storing digital signals for one frame or a plurality of frames. The same is applicable to the memory on the play-back side. The memory on the playback side preferably has a storage capacity corresponding to that of the memory on the recording side.

It is also possible to provide a plurality of memories on the recording side and/or the playback side. In this case, the storage capacity is more easily secured.

In the case of providing a plurality of memories on the recording side and/or the playback side, digital switches are provided on the output ends thereof. The digital switch selects digital signals relating to one memory on the recording side or the playback side from among the digital signals read out of the plurality of memories on the recording side and the playback side and supplies the selected digital signals to the digital recording portion or the digital/analog converter.

The gain of the amplifier connected to the output of the digital/analog converter is set at, for example, 1 in the permission mode and an integer larger than 1 in the inhibition mode. It is especially preferable that the gain is set at 2 in the inhibition mode.

It is also possible to set the gain at the reciprocal of an integer larger than 1 in the inhibition mode. In this case, a gain of ½ is preferable.

The above and other objects, features and advantages of the present invention will become clear from the following description of the preferred embodiments thereof, taken in conjunction with the accompanying drawings.

DESCRIPTION OF THE PREFERRED EMBODIMENTS

Embodiments of the present invention will be explained hereinunder with reference to the accompanying drawings.

Figure 1:
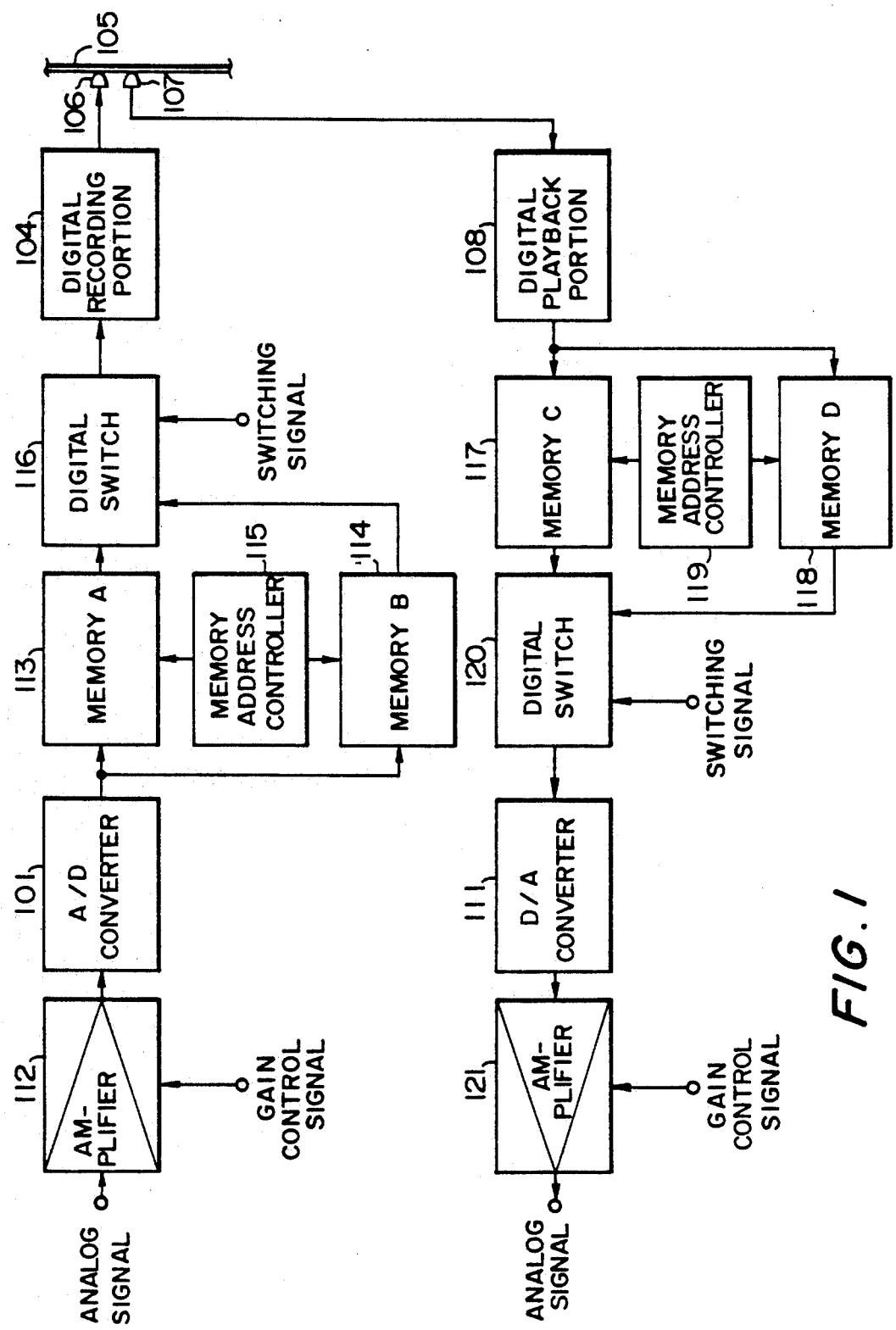
FIG. 1 is a block diagram of the structure of a first embodiment of a digital video recording and playback apparatus according to the present invention, in which two memories are provided both on the recording side and on the playback side, and a digital switch and a memory address controller are provided both on the recording side and on the playback side.

FIG. 1 shows the structure of a first embodiment of a digital video recording and playback apparatus according to the present invention.

In FIG. 1, an amplifier 112 is provided at the precedent stage of an A/D converter 101, and a memory A 113 and a memory B 114 are connected to the output end of the A/D converter 101. A memory address controller 115 is connected to the memory A 113 and the memory B 114, both of which are further connected to a digital switch 116. The digital switch 116 is connected to a digital recording portion 104.

In FIG. 1, a memory C 117 and a memory D 118 are connected to the output end of a digital playback portion 108. A memory address controller 119 is connected to the memory C 117 and the memory D 118, both of which are further connected to the input end of a digital switch 120. The output end of the digital switch 120 is connected to a D/A converter 111, which in turn is connected to an amplifier 121.

The operation of this embodiment will now be explained.

The recording operation will first be explained.

In this embodiment, an analog video signal (hereinunder referred to as "analog signal") such as an NTSC standard analog signal is first inputted to the amplifier 112.

The amplifier 112 is a variable-gain amplifier the gain of which is controlled by a gain control signal. The gain of the amplifier 112 is controlled in accordance with a gain control signal, for example, in order to adjust an analog signal in an input dynamic range of the A/D converter 101.

The analog signal supplied to the A/D converter 101 is converted to a digital video signal (hereinunder referred to as "digital signal") by, for example, 8-bit quantization.

The digital signal converted from the analog signal by the A/D converter 101 is stored in the memory A 113 or the memory B 114. The memory A 113 and the memory B 114 are composed of, for example, a dynamic random access memory.

Figure 3:
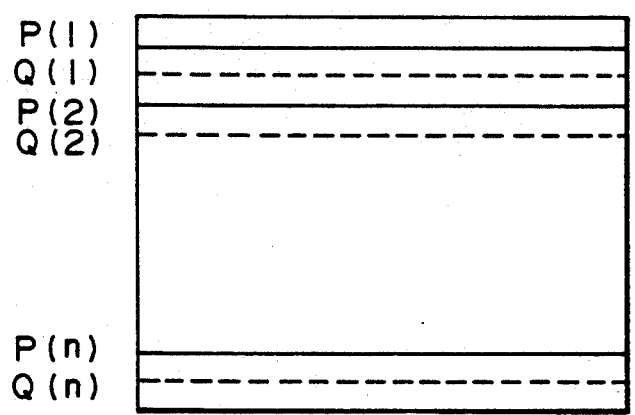
FIG. 3 shows a frame explaining that the unit of digital signals recorded on the digital tape is one field of a picture in the embodiment shown in FIG. 1.

In this embodiment, digital signals are stored in the memory A 113 or the memory B 114 for each field. As shown in FIG. 3, if it is assumed that digital signals for the scanning lines of odd ordinal numbers are represented by P(1), P(2), ... P(n) and those for the scanning lines of even ordinal numbers are represented by Q(1), Q(2), ... Q(n), the memory A 113 stores P(1), P(2), ... P(n) and the memory B 114 stores Q(1), Q(2), ... Q(n).

The storing operations of the memories A 113 and B 114 in this manner are realized under the control of the writing addresses of the memory A 113 and the memory B 114 by the memory address controller 115.

The digital signals stored in the memory A 113 and the memory B 114 are read out to the digital switch 116.

The digital signals are read out of the memory A 113 to the digital switch 116, for example, in the ascending order of the scanning lines, namely, in the order of P(1), P(2), ... P(n). This operation of reading the digital signals from the memory A 113 in the predetermined order can be executed under the control of the reading address of the memory A 113 by the memory address controller 115.

In the same way, the digital signals are read out of the memory B 114 to the digital switch 116 in a predetermined order under the control of the reading address of the memory B 114 by the memory address controller 115. In this case, the order of reading is, for example, the descending order of the scanning lines, namely, the order of Q(n), Q(n −1), ... Q (1).

A switching signal is supplied to the digital switch 116. The switching signal is a signal for selecting either the digital signal read out of the memory A 113 or the digital signal read out of the memory B 114 as the output of the digital switch. In other words, the digital switch 116 selects the digital signal from either the memory A 113 or the memory B 114 in accordance with the switching signal and outputs the selected digital signal.

If the switching signal is a signal having the value which varies synchronously with the controls of the reading addresses of the memory A 113 and the memory B 114 by the memory address controller 115, the digital signals are outputted from the digital switch 116 in the order of, for example, P(1), Q(n), P(2), Q(n−1), ... P(n) and Q(1).

The digital signals outputted from the digital switch 116 in a predetermined order in this way are supplied to the digital recording portion 104. The digital recording portion 104 records the digital signals on the digital audio tape 105 through the recording head 106.

Figure 2:
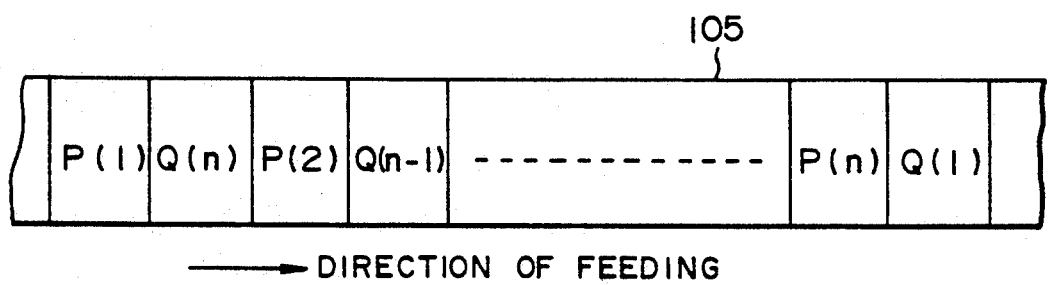
FIG. 2 shows the state of recording signals onto a digital tape in the embodiment shown in FIG. 1.

Since the digital signals are supplied to the digital recording portion 104 in the predetermined order of scanning lines, the digital signals are recorded on the digital audio tape 105 in the predetermined order, as shown in FIG. 2.

That is, according to the above-described example, the order of recording is P(1), Q(n), P(2), Q(n−1), ... P(n) and Q(1).

The operation of playing back the digital signals recorded in this way from the digital audio tape 105 will be explained in the following.

When the digital signals are played back from the digital audio tape 105 by the playback head 107 and the digital playback portion 108, these digital signals are supplied to and stored in the memory C 117 and the memory D 118.

The digital signals are stored in the memory C 117 and the memory D 118 for each field in the same way as in the memory A 113 and the memory B 114 on the recording side. For example, the memory C 117 stores the digital signals P(1), P(2), ... P(n) while the memory D 118 stores the digital signals Q(n), Q(n−1), ... Q (1).

The memory address controller 119 controls the writing/reading addresses of the memory C 117 and the memory D 118. In other words, the digital signals are read out of the memory C 117 and the memory D 118 in the order determined by the control of the memory address controller 119.

The digital signals read out of the memory C 117 and the memory D 118 are supplied to the digital switch 120. A switching signal is supplied to the digital switch 120 in the same way in the case of the digital switch 116, so that the digital signals read out of the memory C 117 and the memory D 118 are outputted from the digital switch 120 in a predetermined order such as the order corresponding to the NTSC standard signal.

The digital signal outputted from the digital switch 120 is supplied to the D/A converter 111 to be converted into an analog signal.

The analog signal output from the D/A converter 111 is inputted to the variable-gain amplifier 121 the gain of which is set in accordance with a gain control signal. The amplifier 121 amplifies the analog signal at a preset gain and outputs the amplified signal to an analog signal processor.

Figure 4:
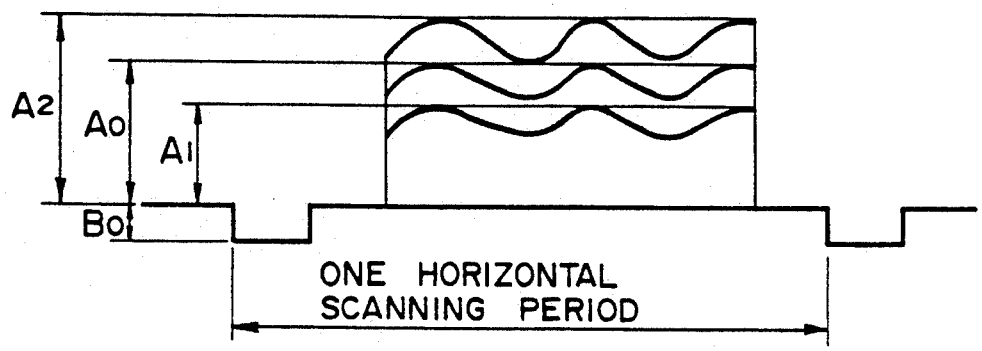
FIG. 4 shows the contents of gain control of the amplifier on the playback side in the embodiment shown in FIG. 1.

The control of the gain of the amplifier 121 will now be explained. FIG. 4 shows an example of the control.

If it is assumed that the amplitude of the synchronous signal component contained in an analog signal is $B_0$ and the amplitude of the video signal component is $A_0$, the analog signal, which is what is called a composite video signal in this case, has an amplitude of $A_0 + B_0$. Particularly, in the NTSC standard signal, $A_0 = 0.71$ V and $B_0 = 0.29$ V.

The gain of the amplifier 121 set for the permission mode is different from the gain set for the inhibition mode.

The permission mode is a mode for permitting an external apparatus to dub signals without deteriorating the picture quality, while the inhibition mode is a mode for outputting analog signals to an external apparatus after deteriorating the picture quality.

For example, the gain of the amplifier 121 is set at 1 in the permission mode and at an integer $A_2$ larger than 1, for example, 2 in the inhibition mode. In this way, the analog signal output from the amplifier 121 and read by an external apparatus has an inferior picture quality to that of the original analog signal (the analog signal in the permission mode).

This effect is also produced by setting the gain of the amplifier 121 at the reciprocal $A_1$ of an integer larger than 1, for example, ½.

The treating unit of digital signals P(i), Q(i) ... (i: integer) may be a plurality of scanning lines or a vertical line in place of one field.

Figure 5:
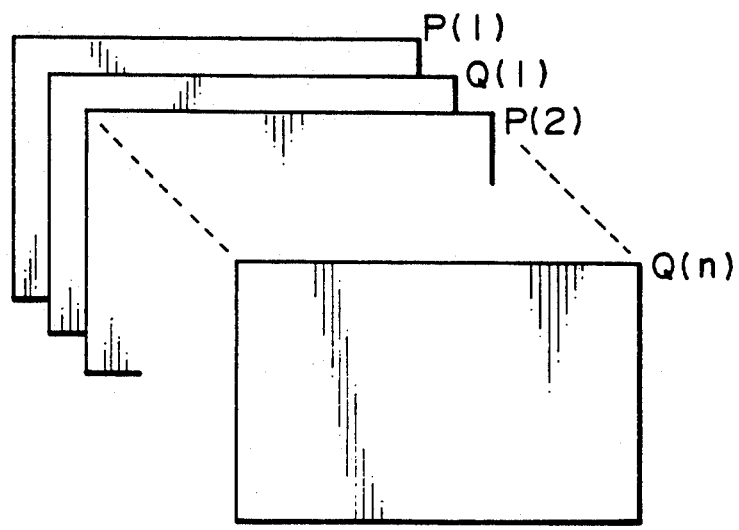
FIG. 5 shows a frame explaining that the unit of digital signals recorded on the digital audio tape is one frame in a second embodiment of the present invention.
Figure 6:
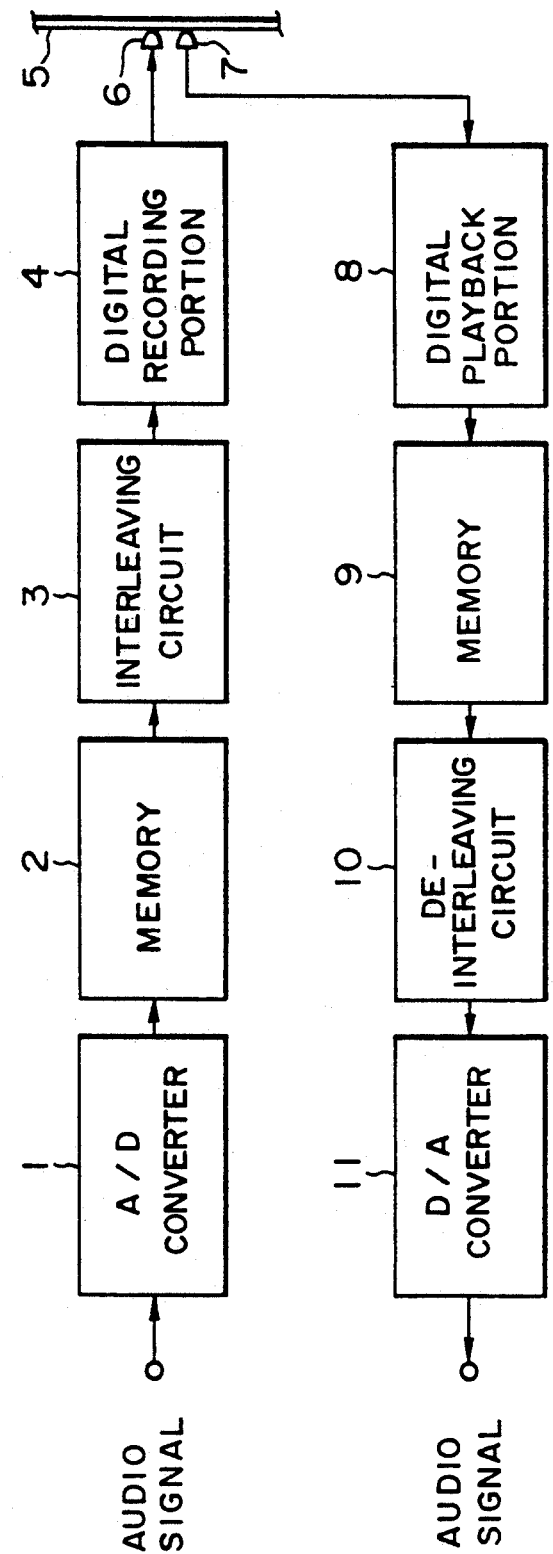
FIG. 6 is a block diagram of an example of the structure of a conventional DAT.

The treating unit may also be one frame, as in a second embodiment shown in FIG. 5.

In FIG. 5, P(i) and Q(i) respectively correspond to one frame.

This embodiment also produces the same effect as the first embodiment.

The treating unit is not restricted to one frame and may be a plurality of frames.

In place of a composite video signal, a three-system RGB-TTL, RGB-analog and Y/C separate signal may be used as an analog signal.

The memory A 113, the memory B 114, the memory C 117 and the memory D 118 may be integrally provided.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A digital video recording and playback apparatus comprising:

first means for outputting an inputted analog signal as a digital signal;

second means for recording said digital signal on a digital audio tape;

third means for reproducing said digital signal from said digital audio tape;

fourth means for converting said digital signal into an analog signal;

fifth means, on a recording side of the apparatus, for dividing digital signals outputted from said first means into predetermined units, each predetermined unit being composed of a plurality of samples, and for storing the samples of each predetermined unit, said fifth means including a plurality of individual memories;

sixth means for selecting samples relating to one memory from among samples read out from said plurality of memories and for supplying the selected samples to said second means; and seventh means, on the recording side of the apparatus, for controlling writing/reading operations on the recording side so that the samples of the predetermined units are written into and read out of said fifth means in a predetermined order, said predetermined order being different for each individual memory.

2. The digital video recording and playback apparatus according to claim 1, wherein said predetermined unit has a capacity corresponding to one frame.

3. The digital video recording and playback apparatus according to claim 1, wherein said predetermined unit has a capacity corresponding to one field.

4. The digital video recording and playback apparatus according to claim 1, wherein said fifth means has a capacity necessary for storing digital signals for one frame.

5. The digital video recording and playback apparatus according to claim 1, wherein said fifth means has a capacity necessary for storing digital signals for a plurality of frames.

6. A digital video recording and playback apparatus comprising:

first means for outputting an inputted analog signal as a digital signal;

second means for recording said digital signal on a digital audio tape;

third means for reproducing said digital signal from said digital audio tape;

fourth means for converting said digital signal into an analog signal;

fifth means, on a recording side of the apparatus, for dividing digital signals outputted from said first means into first predetermined units, each first predetermined unit being composed of a plurality of samples and for storing the, samples of each first predetermined unit, said fifth means including a plurality of individual memories;

sixth means for selecting samples relating to one memory from among samples read out from said first plurality of memories and for supplying the selected samples to said second means;

seventh means, on the recording side of the apparatus, for controlling writing/reading operations on the recording side so that the samples of the first predetermined units are written into and read out of said fifth means in a first predetermined order, said first predetermined order being different for each individual memory;

eighth means, on a playback side of the apparatus, for dividing digital signals outputted from said third means into second predetermined units, each second predetermined unit being composed of a plurality of samples and for storing the samples of each second predetermined unit, said eighth means including a second plurality of individual memories;

ninth means for selecting samples relating to one memory from among samples read out from said second plurality of memories and for supplying the selected samples to said fourth means; and tenth means, on the playback side of the apparatus, for controlling writing/reading operations of said eighth means so that the samples of the second predetermined units are written into and read out of said eighth means in a second predetermined order, said second predetermined order being different for each individual memory.

7. The digital video recording and playback apparatus according to claim 6, wherein said first predetermined unit has a capacity corresponding to one frame, and said second predetermined unit has a capacity corresponding to one frame.

8. The digital video recording and playback apparatus according to claim 6, wherein said first predetermined unit has a capacity corresponding to one field, and said second predetermined unit has a capacity corresponding to one field.

9. The digital video recording and playback apparatus according to claim 6, wherein said fifth means has a capacity necessary for storing digital signals for one frame, and said eighth means has a capacity necessary for storing digital signals for one frame.

10. The digital video recording and playback apparatus according to claim 6, wherein said fifth means has a capacity necessary for storing digital signals for a plurality of frames, and said eighth means has a capacity necessary for storing digital signals for a plurality of frames.

* * * * *